US008934581B2

(12) United States Patent
Samuel Bebawy et al.

(10) Patent No.: US 8,934,581 B2
(45) Date of Patent: Jan. 13, 2015

(54) METHOD AND APPARATUS FOR SOFT SYMBOL PROCESSING IN A COMMUNICATION RECEIVER

(75) Inventors: Michael Samuel Bebawy, San Jose, CA (US); Fredrik Huss, Sundbyberg (SE); Yi-Pin Eric Wang, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 38 days.

(21) Appl. No.: 13/454,919

(22) Filed: Apr. 24, 2012

(65) Prior Publication Data

US 2013/0279559 A1   Oct. 24, 2013

(51) Int. Cl.
*H04L 27/06* (2006.01)

(52) U.S. Cl.
USPC ............ 375/341; 375/262; 714/794; 714/795

(58) Field of Classification Search
USPC .......................................... 375/341, 340, 316
See application file for complete search history.

(56) References Cited

U.S. PATENT DOCUMENTS

| 2005/0141628 | A1 | 6/2005 | Cheng | |
| 2007/0041475 | A1* | 2/2007 | Koshy et al. | 375/340 |
| 2008/0069185 | A1* | 3/2008 | Elezabi | 375/144 |
| 2009/0052591 | A1* | 2/2009 | Chen | 375/341 |
| 2010/0272200 | A1* | 10/2010 | Ahn et al. | 375/260 |
| 2011/0222618 | A1 | 9/2011 | Huss et al. | |
| 2012/0014480 | A1 | 1/2012 | Gotman et al. | |
| 2013/0077670 | A1* | 3/2013 | Wang et al. | 375/233 |

FOREIGN PATENT DOCUMENTS

| GB | 2388760 A | 11/2003 |
| WO | 03075528 A1 | 9/2003 |
| WO | 2010043556 A1 | 4/2010 |
| WO | 2011/112141 A1 | 9/2011 |

OTHER PUBLICATIONS

3rd Generation Partnership Project. 3GPP TS 25.213, V9.1.0 (Dec. 2009). 3rd Generation Partnership Project; Technical Specification Group Radio Access Network; Spreading and modulation (FDD) (Release 9). Dec. 2009.

(Continued)

*Primary Examiner* — Adolf Dsouza
(74) *Attorney, Agent, or Firm* — Murphy Bilak & Homiller, PLLC

(57) ABSTRACT

In one aspect, the present invention improves Turbo equalization and/or soft interference cancellation processing in communication receivers by providing an efficient and accurate technique to compute the second moment of a received symbol, e.g., an interfering symbol, as a function of the expected bit values of only those bits in the symbol that are magnitude-controlling bits according to a defined modulation constellation. Advantageously, the expected bit values in at least one embodiment are computed using a LUT that maps bit LLRs to corresponding hyperbolic tangent function values. Further, the expected symbol value is computed as a linear function of terms comprising the expected bit values and the soft symbol variance is efficiently computed from the second moment and the expected symbol value squared. This simplified processing reduces receiver complexity, particularly in the context of modulation constellations having non-constant magnitudes, and thus saves power and/or improves design economics.

18 Claims, 5 Drawing Sheets

(56) References Cited

OTHER PUBLICATIONS

Chindapol, A. et al. "Design, Analysis, and Performance Evaluation for BICM-ID with Square QAM Constellations in Rayleigh Fading Channels." IEEE Journal on Selected Areas in Communications, vol. 19, No. 5, May 2001.

Dejonghe A., et al., "Turbo-equalization for multilevel modulation: an efficient low-complexity scheme," Communications, 2002. ICC 2002. IEEE International Conference. 2002. pp. 1863-1867. vol. 3.

* cited by examiner

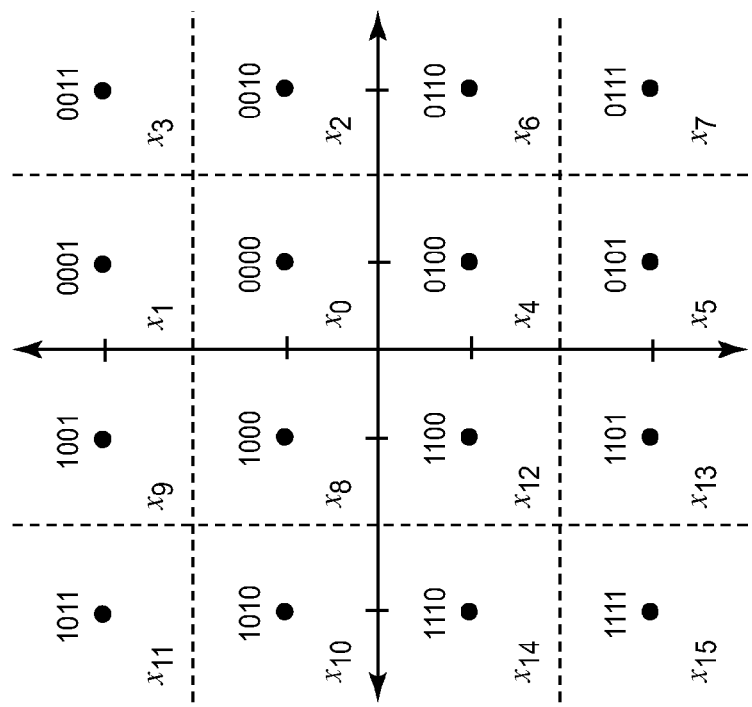
PRIOR ART
FIG. 3
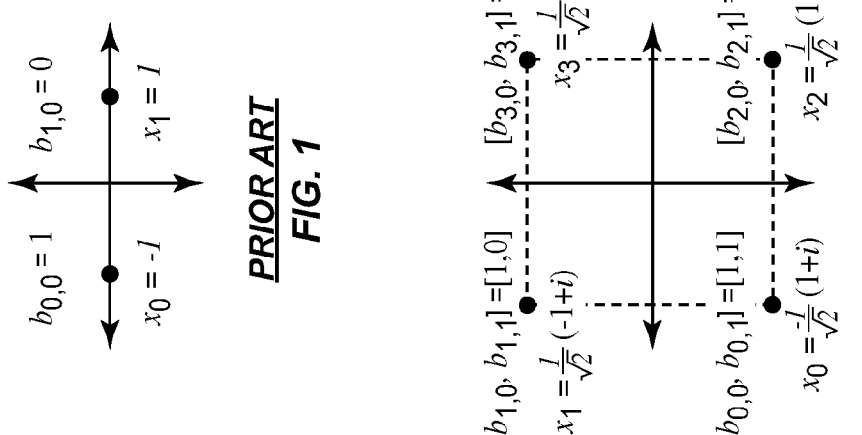
PRIOR ART
FIG. 1
PRIOR ART
FIG. 2

| $b_{i,0}$ | $b_{i,1}$ | $b_{i,2}$ | $b_{i,3}$ | $\Re\{x_i\}$ | $\Im\{x_i\}$ | $b_{i,0}$ | $b_{i,1}$ | $b_{i,2}$ | $b_{i,3}$ | $\Re\{x_i\}$ | $\Im\{x_i\}$ |
|---|---|---|---|---|---|---|---|---|---|---|---|
| 0 | 0 | 0 | 0 | 1 | -1 | 1 | 0 | 0 | 0 | -3 | 3 |
| 0 | 0 | 0 | 1 | -3 | 1 | 1 | 0 | 0 | 1 | 1 | -3 |
| 0 | 0 | 1 | 0 | -1 | 1 | 1 | 0 | 1 | 0 | 3 | -3 |
| 0 | 0 | 1 | 1 | 3 | -1 | 1 | 0 | 1 | 1 | -1 | 3 |
| 0 | 1 | 0 | 0 | -3 | 1 | 1 | 1 | 0 | 0 | 1 | 3 |
| 0 | 1 | 0 | 1 | 1 | 1 | 1 | 1 | 0 | 1 | -3 | -3 |
| 0 | 1 | 1 | 0 | 3 | -1 | 1 | 1 | 1 | 0 | -1 | -3 |
| 0 | 1 | 1 | 1 | -1 | -1 | 1 | 1 | 1 | 1 | 3 | 3 |

PRIOR ART
FIG. 4

METHOD AND APPARATUS FOR SOFT SYMBOL PROCESSING IN A COMMUNICATION RECEIVER

TECHNICAL FIELD

The present invention generally relates to communication signal processing, and particularly relates to soft symbol processing in that context.

BACKGROUND

In Turbo equalization and soft interference cancellation, demodulation and decoding are done in an iterative way. In every iteration, a signal regeneration step computes the soft symbols (the expected value of the symbols), $\bar{s}_n$, and their variances, $\sigma_n^2$, for every symbol $S_n$. The soft symbols can be used for interference cancellation, whereas their variances can be used in formulating linear equalization coefficients. These two quantities are defined as $$\bar{s}_n \triangleq E[S_n] = \Sigma_{i=0}^{M-1} x_i \cdot Pr[S_n = x_i], \tag{1a}$$

$$\sigma_n^2 \triangleq E[|S_n|^2] - |\bar{s}_n|^2 = \Sigma_{i=0}^{M-1} |x_i|^2 \cdot Pr[S_n = x_i] - |\bar{s}_n|^2, \tag{1b}$$

where M is the size of the constellation used for transmission and $x_i$ is the ith member of this constellation. Note that the first term on the right-hand side of equation (1b) represents the second moment of symbol value. Thus, the soft symbol variance $\sigma_n^2$, for every symbol $S_n$ can be determined by the second moment of symbol value and the expected value of the symbols. The relationship between the variance, second moment, and expected value of a random variance is well known in the probability and random process literature.

The signal regeneration step requires the probability distribution of the symbol $S_n$, $Pr[S_n = x_i]$, $i=0, 1, \ldots, M-1$, to calculate these quantities. What is actually available to the signal regeneration step after every turbo iteration are the bit log-likelihood ratios (LLR), rather than the symbol probability distributions. The bit LLR of the kth bit of the nth symbol, $B_{n,k}$, is $$L_{n,k} \triangleq \log \frac{Pr[B_{n,k} = 0]}{Pr[B_{n,k} = 1]}. \tag{2}$$

Let the bit representation of the symbol $x_i$ in the constellation be $$x_i \longmapsto [b_{i,0}, \ldots, b_{i,Q-1}], \tag{3}$$

where $b_{i,k} \in \{0,1\}$ and $Q = \log_2 M$. Define the bipolar bits, $b'_{i,k} \triangleq 1 - 2 \cdot b_{i,k}$, so that $b'_{i,k} = 1$ when $b_{i,k} = 0$ and $b'_{i,k} = -1$ when $b_{i,k} = 1$. Then, it can be shown that the probability $Pr[S_n = x_i]$ is $$Pr[S_n = x_i] \triangleq \prod_{k=0}^{Q-1} [B_{n,k} = b_{i,k}] = C_n \cdot \exp\left[\frac{1}{2} \sum_{k=0}^{Q-1} b'_{i,k} \cdot L_{n,k}\right], \tag{4}$$

where $C_n$ is a scaling factor independent of i or k but depends on n. That is, it is independent of the constellation but must be computed for every symbol $S_n$.

Existing solutions involve either high complexity or too much inaccuracy. For example, to get exact values of the expected value and variance with a general 16-QAM, the 16 probabilities $Pr[S_n = x_i]$ for $i=0, 1, \ldots, 15$, must be computed from the bit LLRs according to (4), then the soft symbols in (1a) and finally the variances in (1b). Note that (1a) and (1b) cannot be done in parallel. First the means must be computed and then the variances. (The computation of (1a) and the first term on the right-hand side of (1b) however can be performed in parallel.) The mean (1a) requires sixteen multiplications and fifteen additions. The variance (1b), on the other hand, requires seventeen multiplications and sixteen additions.

On the other hand, a low complexity approach to compute the variances is $$\sigma_n^2 \approx 1 - |\bar{s}_n|^2. \tag{5}$$

This approximation gives results whose quality deteriorates with the turbo iterations because $E[|S_n|^2]$ becomes significantly different from 1. The approximate variances might even be negative and require clipping.

SUMMARY

In one aspect, the present invention improves Turbo equalization and/or soft interference cancellation processing in communication receivers, by providing an efficient and accurate technique to compute the second moment of a received symbol, e.g., an interfering symbol, as a function of the expected bit values of only those bits in the symbol that are magnitude-controlling bits according to the defined constellation associated with the symbol. Advantageously, the expected bit values in at least one embodiment are computed using a look-up-table that maps bit Log Likelihood Ratios (LLRs) to corresponding hyperbolic tangent function values. Further, the expected symbol value is computed as a function of terms comprising the expected bit values and the soft symbol variance is efficiently computed from the second moment and the expected symbol value squared. This simplified processing reduces receiver complexity, particularly in the context of modulation constellations having non-constant magnitudes, and thus saves power and/or improves design economics.

In one or more embodiments, the present invention comprises a method of soft symbol processing in a communication receiver. The method includes receiving LLRs from a decoder in the communication receiver that correspond to bits in one or more interfering symbols in a communication signal received by the communication receiver. The method further includes calculating expected bit values for the bits in each interfering symbol as a function of the corresponding LLRs, and calculating a second moment of the expected symbol value for each interfering symbol.

Advantageously, the second moment computation is simplified in the sense that it is computed using one or more terms comprising the expected bit values of only those bits in the interfering symbol that are magnitude-controlling bits in accordance with a defined bit-to-symbol mapping of a defined constellation used to modulate the interfering symbol for transmission. In an example computation, the second moment is computed as a linear function of terms based on expected bit values of the magnitude-controlling bits of the interfering symbol—terms that either are functions of single expected bit values or products of expected bit values—and this approach preserves the calculation simplicity while readily adapting to modulation constellations of non-constant magnitude with arbitrary order or complexity.

In one or more embodiments, the method further includes calculating the expected symbol value of each interfering symbol as a linear function of terms comprising the expected bit values for all of the bits in the interfering symbol, and calculating a variance of the expected symbol value for each interfering symbol, referred to as a "soft symbol variance," based on the second moment of the expected symbol value calculated for the interfering symbol and the corresponding expected symbol value squared.

Further, in at least one embodiment the method is performed in a Turbo equalizer arrangement. Here, the expected symbol values, also referred to as "complex soft symbol values," are used to regenerate the received signal component(s) corresponding to the interfering symbol(s), which is then subtracted from or otherwise combined with the received signal, to suppress interference arising from the interfering symbol(s). Additionally, in one or more embodiments, the soft symbol variances are used to generate equalization weights, which are then used to equalize the interference-cancelled received signal for demodulation.

In an example implementation, a communication receiver is configured to perform soft symbol processing, e.g., for Turbo equalization, and comprises one or more processing circuits that are configured to provide such soft symbol processing. In one or more such embodiments, the one or more processing circuits—also referred to as a "soft modulation processing circuit" herein—are configured to receive LLRs from a decoder in the communication receiver. The LLRs correspond to bits in one or more interfering symbols in a communication signal received by the communication receiver, and the one or more processing circuits are configured to calculate expected bit values for the bits in each interfering symbol as a function of the corresponding LLRs, and to calculate a second moment of the expected symbol value for each interfering symbol using one or more terms comprising the expected bit values of only those bits in the interfering symbol that are magnitude-controlling bits in accordance with a defined bit-to-symbol mapping of the defined constellation.

The communication receiver in one or more embodiments is configured as a Turbo equalizer and includes an interference cancellation circuit, along with an equalization circuit. Correspondingly, the soft modulation processing circuit computes expected symbol values for the interfering symbols using the expected bit values for those symbols, as computed from corresponding LLRs, and these expected symbol values are used in the interference cancellation circuit to regenerate a received signal component corresponding to the interfering symbols.

That regenerated signal is subtracted from or otherwise combined with the received signal to suppress interference. The interference-suppressed signal is equalized in an equalization circuit that computes equalization weights, which are computed from the soft symbol variances corresponding to the expected symbol values. In turn, those soft symbol variances are advantageously computed as a function of the corresponding second moments and expected symbol values.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 1-3 are diagrams of known modulation constellations and illustrate various bit-to-symbol mappings defined by such constellations for their constituent symbols.

FIG. 4 presents a table corresponding to a known mixed set-partitioning for a 16-QAM constellation.

DETAILED DESCRIPTION

Figure 5:
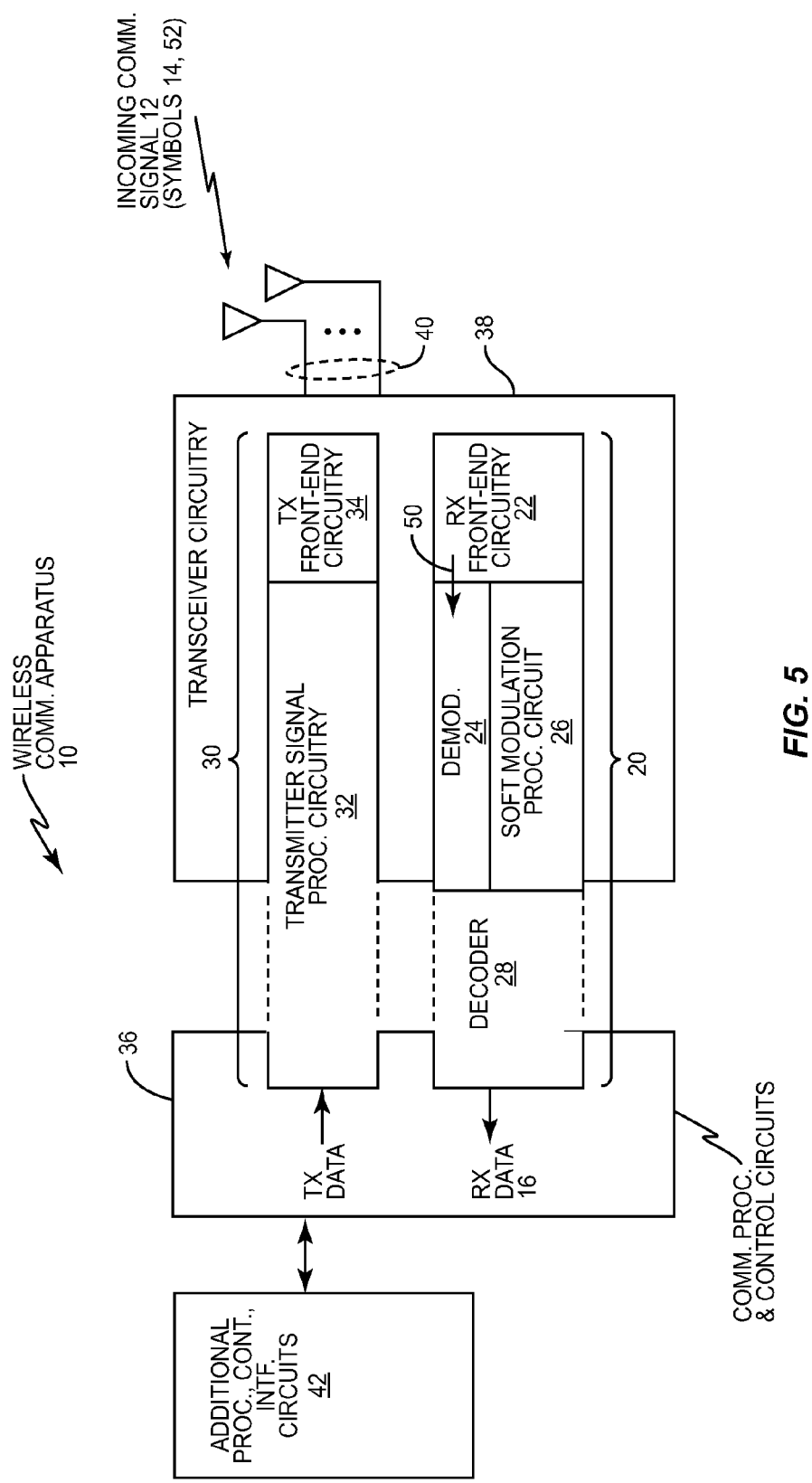
FIG. 5 is a block diagram of one embodiment of a wireless communication apparatus.

This example discussion initially focuses on the derivation of expressions for the constellation symbols and their squared values as a function of the bipolar bits, as defined in the Background section. These derivations need only be done once for a given constellation and the resulting expressions are implemented in a communication receiver, e.g., in hardware and/or programmed in software. After the initial derivation explanation, the discussion turns to example illustrations showing how to use the derived expressions to compute the expected value and variance for each symbol. Such steps are repeated for every received symbol of interest. Here, a received symbol of "interest" may be any symbol that is causing interference, either self-interference or interference with respect to another, desired symbol.

An example approach to derivation includes these actions:
1. Obtain an expression for the real and imaginary parts of the constellation symbols $x_i$ as functions of the bipolar bits $b'_{i,k}$ as in (7a) and (7b). This is done by using the mapping rule to determine the u- and v-coefficients in (8a)-(8d).
2. Obtain an expression for the square of the real and imaginary parts of the constellation symbols $x_i$ as functions of the bipolar bits $b'_{i,k}$ as in (15a) and (15b). This is done by squaring the expressions obtained in the previous step.

As for applying the derivation results in "live" receiver processing, example processing actions repeated for every received symbol of interest include these actions:
1'. For the nth symbol, $S_n$, use a lookup table of the hyperbolic tan function to find tan h $$\left(\frac{L_{n,k}}{2}\right),$$

for k=0, ..., Q−1, where $L_{n,k}$ is the LLR of the kth bit of $S_n$.

2'. To calculate the expected value $\bar{s}_n$, use expressions (7a) and (7b) obtained in Step (1) after replacing $b'_{i,k}$ by tan h $$\left(\frac{L_{n,k}}{2}\right),$$

for k=0, ..., Q−1. This is shown in (12) and (13) below.

3'. To calculate the variance $\sigma_n^2$, use expressions (15a) and (15b) obtained in Step (2) after replacing $b'_{i,k}$ by tan h $$\left(\frac{L_{n,k}}{2}\right),$$

for k=0, ..., Q−1 and subtracting the squared magnitude of $\bar{s}_n$ obtained in Step (2'). This is shown in (12) and (13).

A communication receiver configured to carry out the processing steps set forth immediately above is able to compute the exact expected value and variance of the symbol very efficiently. This advantageous processing results because:

1. Prior computation of the probability distribution in (4) is not required.
2. The overall processing requires fewer floating-point operations than the definitions in (1a) and (1b). The simplification gains increase as the (modulation) constellation size increases.

The constellations symbols are complex in general consisting of a real and an imaginary parts $$x_i = \Re\{x_i\} + \iota \cdot \Im\{x_i\}, \quad (6)$$

where $\Re\{x_i\}$ and $\Im\{x_i\}$ are real-valued and belong to a finite set. For example, for 16-QAM, $\Re\{x_i\}$ and $\Im\{x_i\}$ belong to the set $$\left\{\frac{\pm 1}{\sqrt{10}}, \frac{\pm 3}{\sqrt{10}}\right\}.$$

A general way to express $\Re\{x_i\}$ and $\Im\{x_i\}$ as functions of $\{b'_{i,0}, \ldots, b'_{i,Q-1}\}$ is $$\Re\{x_i\} = \sum_{q=0}^{Q} f_q(b'_{i,0}, \ldots, b'_{i,Q-1}), \quad (7a)$$

$$\Im\{x_i\} = \sum_{q=0}^{Q} g_q(b'_{i,0}, \ldots, b'_{i,Q-1}) \quad (7b)$$

where $f_q(b'_{i,0}, \ldots, b'_{i,Q-1})$ and $g_q(b'_{i,0}, \ldots, b'_{i,Q-1})$ are linear combinations of products of all the q-tuples of bits. That is to say $$f_0(b'_{i,0}, \ldots, b'_{i,Q-1}) = u_0, \quad (8a)$$
$$g_0(b'_{i,0}, \ldots, b'_{i,Q-1}) = v_0,$$

$$f_1(b'_{i,0}, \ldots, b'_{i,Q-1}) = \sum_{k=0}^{Q-1} u_{1,k} \cdot b'_{i,k}, \quad (8b)$$

$$g_1(b'_{i,0}, \ldots, b'_{i,Q-1}) = \sum_{k=0}^{Q-1} v_{1,k} \cdot b'_{i,k},$$

$$f_2(b'_{i,0}, \ldots, b'_{i,Q-1}) = \sum_{k_1=0}^{Q-2} \sum_{k_2=k_1+1}^{Q-1} u_{2,k_1 k_2} \cdot b'_{i,k_1} \cdot b'_{i,k_2}, \quad (8c)$$

$$g_2(b'_{i,0}, \ldots, b'_{i,Q-1}) = \sum_{k_1=0}^{Q-2} \sum_{k_2=k_1+1}^{Q-1} v_{2,k_1 k_2} \cdot b'_{i,k_1} \cdot b'_{i,k_2},$$

$$\vdots$$

$$f_Q(b'_{i,0}, \ldots, b'_{i,Q-1}) = u_{Q,0,\ldots,Q-1} \cdot b'_{i,1} \ldots b'_{i,Q-1}, \quad (8d)$$
$$g_Q(b'_{i,0}, \ldots, b'_{i,Q-1}) = v_{Q,0,\ldots,Q-1} \cdot b'_{i,1} \ldots b'_{i,Q-1}.$$

Any mapping can be expressed in this way. The u- and v-coefficients are defined by the mapping rule. For practical constellations, only few of them are nonzero, as will be shown in the later examples. Using these expressions, the soft symbol and its variance in (1a) and (1b) can be expressed as functions of the bit LLRs.

It is useful to first show the expressions for the soft symbol $\underline{s}_n = \Re\{\bar{s}_n\} + \Im\{\bar{s}_n\}$. Its real part is $$\Re\{\bar{s}_n\} = \sum_{i=0}^{M-1} \Re\{x_i\} \cdot Pr[S_n = x_i] \quad (9a)$$

$$= \sum_{b_{i,0}=0,1} \cdots \sum_{b_{i,Q-1}=0,1} \left( \sum_{q=0}^{Q} f_q(b'_{i,0}, \ldots, b'_{i,Q-1}) \cdot \prod_{k=0}^{Q-1} Pr[B_{n,k} = b_{i,k}] \right) \quad (9b)$$

$$= \sum_{q=0}^{Q} \left( \sum_{b_{i,0}=0,1} \cdots \sum_{b_{i,Q-1}=0,1} f_q(b'_{i,0}, \ldots, b'_{i,Q-1}) \cdot \prod_{k=0}^{Q-1} Pr[B_{n,k} = b_{i,k}] \right) \quad (9c)$$

Using the identity $$\sum_{b_{i,k}=0,1} b'_{i,k} \cdot Pr[B_{n,k} = b_{i,k}] = \tanh\left(\frac{L_{n,k}}{2}\right), \quad (10)$$

one can show that the bracketed expression on the RHS of (9c) reduces to $$\sum_{b_{i,0}} \cdots \sum_{b_{i,Q-1}} f_q(b'_{i,0}, \ldots, b'_{i,Q-1}) \cdot \prod_{k=0}^{Q-1} Pr[B_{n,k} = b_{i,k}] = \quad (11)$$

$$f_q\left(\tanh\left(\frac{L_{n,0}}{2}\right), \ldots, \tanh\left(\frac{L_{n,Q-1}}{2}\right)\right).$$

Therefore, $$\Re\{\bar{s}_n\} = \sum_{q=0}^{Q} f_q\left(\tan\left(\frac{L_{n,0}}{2}\right), \ldots, \tanh\left(\frac{L_{n,Q-1}}{2}\right)\right) \quad (12)$$

$$\Im\{\bar{s}_n\} = \sum_{q=0}^{Q-1} g_q\left(\tanh\left(\frac{L_{n,0}}{2}\right), \ldots, \tanh\left(\frac{L_{n,Q-1}}{2}\right)\right) \quad (13)$$

Note the analogy between the Right Hand Side (RHS) of (12) and (7a) and between (13) and (7b). The expressions are the same except for replacing each of the bipolar bits with the hyperbolic tangent of half the corresponding LLR. Therefore, the soft symbols can be computed in a straightforward way from the knowledge of the f- and g-functions.

Now consider the symbol variance, $\sigma_n^2$. It can be computed from $$\sigma_n^2 = E[|S_n|^2] - |E[S_n]|^2 \quad (14a)$$

$$= \left(\sum_{i=0}^{M-1} \Re\{x_i\}^2 \cdot Pr[S_n = x_i]\right) + \quad (14b)$$

$$\left(\sum_{i=0}^{M-1} \Im\{x_i\}^2 \cdot Pr[S_n = x_i]\right) - \Re\{\bar{s}_n\}^2 - \Im\{\bar{s}_n\}^2.$$

The key to evaluating the two summations on the RHS of (14b) is that $\Re\{x_i\}^2$ and $\Im\{x_i\}^2$ can be expressed in a form similar to $\Re\{x_i\}$ and $\Im\{x_i\}$ in (7a) and (7b) respectively, thanks to the fact that ${b'_{i,k}}^2 = 1$ for all i and k. For any constellation, one may square (7a) and (7b), and collect like terms, and thereby express $\Re\{x_i\}^2$ and $\Im\{x_i\}^2$ as $$\Re\{x_i\}^2 = \Sigma_{q=0}^{Q} h_q(b'_{i,0}, \ldots, b'_{i,Q-1}) \quad (15a)$$

$$\Im\{x_i\}^2 = \Sigma_{q=0}^{Q} r_q(b'_{i,0}, \ldots, b'_{i,Q-1}) \quad (15b)$$

where $h_q(b'_{i,0}, \ldots, b'_{i,Q-1})$ and $r_q(b'_{i,0}, \ldots, b'_{i,Q-1})$ have the form of $f_q(b'_{i,0}, \ldots, b'_{i,Q-1})$ and $g_q(b'_{i,0}, \ldots, b'_{i,Q-1})$ (but with different coefficients), then the soft symbol variance is given by $$\sigma_n^2 = \sum_{q=0}^{Q} h_q\left(\tanh\left(\frac{L_{n,0}}{2}\right), \ldots, \tanh\left(\frac{L_{n,Q-1}}{2}\right)\right) + r_q\left(\tanh\left(\frac{L_{n,0}}{2}\right), \ldots, \tanh\left(\frac{L_{n,Q-1}}{2}\right)\right) - \Re\{\bar{s}_n\}^2 - \Im\{\bar{s}_n\}^2 \quad (16)$$

As an example, consider the evaluation of (7a), (7b), (12), (13), (15a), (15b) and (16) for the Gray-mapped 3GPP constellations used in High Speed Packet Access (HSPA) and Long Term Evolution (LTE) communication networks.

The BPSK constellation does not have an imaginary component and the number of bits per symbol, Q=1. The real component is given by $$\Re\{x_i\} = b'_{i,0} \quad (17)$$

as shown in FIG. 1. This means that $u_{1,0}=1$ and all the other u- and v-coefficients are zero. The square of the symbol is always $\Re\{x_i\}^2=1$. This means that $h_0(b'_{i,0})=1$ and $h_1(b'_{i,0})=0$. All the other h- and r-functions are zero. The soft symbol and its variance reduce to $$\bar{s}_n = \tanh\left(\frac{L_{n,k}}{2}\right) \quad (18a)$$

$$\sigma_n^2 = 1 - |\bar{s}_n|^2 \quad (18b)$$

See the corresponding illustration of the BPSK constellation in FIG. 1.

For QPSK, there are two bits per symbol (Q=2). The real and imaginary part of $x_i$ are each a scaled version of one of the two bits $$\Re\{x_i\} = \frac{1}{\sqrt{2}} \cdot b'_{i,0} \quad (19a)$$

$$\Im\{x_i\} = \frac{1}{\sqrt{2}} \cdot b'_{i,1} \quad (19b)$$

This is shown in FIG. 2. Consequently, $$u_{1,0} = v_{1,1} = \frac{1}{\sqrt{2}}$$

and all the other u- and v-parameters are zero. The square of the real and imaginary components is constant $$\Re\{x_i\}^2 = \Im\{x_i\}^2 = \frac{1}{2}.$$

This means that $$h_0(b'_{i,0}, b'_{i,1}) = r_0(b'_{i,0}, b'_{i,1}) = \frac{1}{2}.$$

All the other h- and r-functions are zero. The soft symbol and its variance reduce to $$\bar{s}_n = \frac{1}{\sqrt{2}} \cdot \left(\tanh\left(\frac{L_{n,0}}{2}\right) + \iota \cdot \tanh\left(\frac{L_{n,1}}{2}\right)\right) \quad (20a)$$

$$\sigma_n^2 = 1 - |\bar{s}_n|^2 \quad (20b)$$

The Gray-mapped 16-QAM constellation in FIG. 3 is taken from the 3GPP standard—for reference, see the Technical Specification (TS) identified as 3GPP TSG-RAN WG4 TS 25.213, v.9.1.0, January 2010. The number of bits per symbol Q=4. The order of the bits shown in the figure from left to right is $[b_{i,0}, b_{i,1}, b_{i,2}, b_{i,3}]$. The real and imaginary parts of the constellation symbol can be expressed as functions of the bipolar bits $b'_{i,k}$ as $$\Re\{x_i\} = \frac{1}{\sqrt{10}} \cdot b'_{i,0} \cdot (2 - b'_{i,2}) \quad (21a)$$

$$\Im\{x_i\} = \frac{1}{\sqrt{10}} \cdot b'_{i,1} \cdot (2 - b'_{i,3}) \quad (21b)$$

This means that $$u_{1,0} = v_{1,1} = \frac{2}{\sqrt{10}} \text{ and } u_{2,0,2} = v_{2,1,3} = \frac{-1}{\sqrt{10}}.$$

All the other u- and v-coefficients are zero. By squaring (21a) and (21b), one obtains $$\Re\{x_i\}^2 = \frac{5}{10} - \frac{4}{10} \cdot b'_{i,2}, \quad (22a)$$

$$\Im\{x_i\}^2 = \frac{5}{10} - \frac{4}{10} \cdot b'_{i,3}. \quad (22b)$$

The h- and r-functions can be deduced in a way similar to QPSK. The soft symbol and its variance are now given by $$\bar{s}_n = \frac{1}{\sqrt{10}} \cdot \left[\tanh\left(\frac{L_{n,0}}{2}\right) \cdot \left(2 - \tanh\left(\frac{L_{n,2}}{2}\right)\right) + \iota \cdot \tanh\left(\frac{L_{n,1}}{2}\right) \cdot \left(2 - \tanh\left(\frac{L_{n,3}}{2}\right)\right)\right] \quad (23a)$$

$$\sigma_n^2 = 1 - \frac{4}{10} \cdot \left(\tanh\left(\frac{L_{n,2}}{2}\right) + \tanh\left(\frac{L_{n,3}}{2}\right)\right) - \Re\{\bar{s}_n\}^2 - \Im\{\bar{s}_n\}^2 \quad (23b)$$

In (23b) immediately above, the expression $$1 - \frac{4}{10} \cdot \left(\tanh\left(\frac{L_{n,2}}{2}\right) + \tanh\left(\frac{L_{n,3}}{2}\right)\right)$$

is the second moment of the expected symbol value. With a simple expansion, the expression becomes $$1 - \frac{4}{10} \cdot \tanh\left(\frac{L_{n,2}}{2}\right) - \frac{4}{10} \cdot \tanh\left(\frac{L_{n,3}}{2}\right),$$

and is clearly seen as one or more terms comprising the expected bit values of only those bits in the symbol of interest that are magnitude-controlling bits in accordance with the defined bit-to-symbol mapping set by the defined constellation used for modulation of the symbol of interest. Thus, one sees the advantageous computation of the soft symbol variance $\sigma_n^2$ as a function of the expected symbol value, i.e., via the terms $\Re\{\bar{s}_n\}^2$ and $\Im\{\bar{s}_n\}^2$, and the second moment. The same type of simple expansion can be applied to (23a), to see that the expected symbol value of the symbol of interest is computed using terms comprising the expected bit values for all of the bits in the symbol of interest, e.g., as a linear function of terms that are based on the expected bit values of all of the bits in the symbol of interest.

An alternative approach is to use the average sign value technique shown by way of example in the pending U.S. patent application Ser. No. 12/722,169, as filed on 11 Mar. 2010. For the constellation shown in FIG. 3, the order of the shown bit values is $[b_{i,0}, b_{i,1}, b_{i,2}, b_{i,3}]$. Bits $b_{i,0}$ and $b_{i,2}$ determine the real part and bits $b_{i,1}$ and $b_{i,3}$ determine the imaginary part. For the real part, $b_{i,0}$ determines the sign and $b_{i,2}$ determines the magnitude as seen from (21a) and (21b). Thus, $b_{i,0}$ does not have an impact on $\Re\{x_i\}^2$, whereas $$\Re\{x_i\}^2 = \frac{1}{10}$$

when $b_{i,2}=0$ and $$\Re\{x_i\}^2 = \frac{9}{10}$$

when $b_{i,2}=1$. Thus, there are sign-controlling bits and magnitude-controlling bits according to the bit-to-symbol (or symbol-to-bit) mapping used to define the constellation, and the present invention makes advantageous use of the sign-controlling bits in the simplified computations disclosed herein.

With that point in mind, define a new variable $z_R$ as $$z_R = \frac{5 - 10\Re\{x_i\}^2}{4}, \quad (24)$$

then $$E[\Re\{x_i\}^2] = \frac{5 - 4 \cdot E[z_R]}{10}. \quad (25)$$

Note that $z_R=1$ when $b_{i,2}=0$, and $z_R=-1$ when $b_{i,2}=1$. The mean or expected value of $z_R$ can be expressed as the average (or expected) sign value of $b_{i,2}$ $$E[z_R] = \tanh\left(\frac{L_{n,2}}{2}\right). \quad (26)$$

Thus, $$E[\Re\{x_i\}^2] = \frac{5 - 4 \cdot \tanh\left(\frac{L_{n,2}}{2}\right)}{10}. \quad (27)$$

Similarly, $$E[\Im\{x_i\}^2] = \frac{5 - 4 \cdot \tanh\left(\frac{L_{n,3}}{2}\right)}{10}. \quad (28)$$

Note that expressions (27) and (28) are analogous to expressions (22a) and (22b), respectively.

Consider the Gray-mapped 64-QAM constellation of the 3GPP standard. In a similar way, it can be shown that the real and imaginary parts of $x_i$ are $$\Re\{x_i\} = \frac{1}{\sqrt{42}} \cdot b'_{i,0} \cdot (4 - 2 \cdot b'_{i,2} + b'_{i,2} \cdot b'_{i,4}) \quad (29a)$$

$$\Im\{x_i\} = \frac{1}{\sqrt{42}} \cdot b'_{i,1} \cdot (4 - 2 \cdot b'_{i,3} + b'_{i,3} \cdot b'_{i,5}) \quad (29b)$$

This means that $$u_{1,0} = v_{1,1} = \frac{4}{\sqrt{42}},$$

$$u_{2,0,2} = v_{2,1,3} = \frac{-2}{\sqrt{42}} \text{ and}$$

$$u_{3,0,2,4} = v_{3,1,3,5} = \frac{1}{\sqrt{42}}.$$

All the other u- and v-coefficients are zero. By squaring (29a) and (29b), one gets $$\Re\{x_i\}^2 = \frac{1}{42} \cdot (21 - 16 \cdot b'_{i,2} - 4 \cdot b'_{i,4} + 8 \cdot b'_{i,2} \cdot b'_{i,4}), \quad (30a)$$

$$\Im\{x_i\}^2 = \frac{1}{42} \cdot (21 - 16 \cdot b'_{i,3} - 4 \cdot b'_{i,5} + 8 \cdot b'_{i,3} \cdot b'_{i,5}). \quad (30b)$$

Based on that, the soft symbol and its variance are given by $$\Re\{\bar{s}_n\} = \quad (31a)$$
$$\frac{1}{\sqrt{42}} \cdot \tanh\left(\frac{L_{n,0}}{2}\right) \cdot \left(-2 \cdot \tanh\left(\frac{L_{n,2}}{2}\right) + \tanh\left(\frac{L_{n,2}}{2}\right) \cdot \tanh\left(\frac{L_{n,4}}{2}\right) + 4\right)$$

$$\Im\{\bar{s}_n\} = \quad (31b)$$
$$\frac{1}{\sqrt{42}} \cdot \tanh\left(\frac{L_{n,1}}{2}\right) \cdot \left(-2 \cdot \tanh\left(\frac{L_{n,3}}{2}\right) + \tanh\left(\frac{L_{n,3}}{2}\right) \cdot \tanh\left(\frac{L_{n,5}}{2}\right) + 4\right)$$

$$\sigma_n^2 = 1 - \frac{16}{42} \cdot \left(\tanh\left(\frac{L_{n,2}}{2}\right) + \tanh\left(\frac{L_{n,3}}{2}\right)\right) - \quad (31c)$$
$$\frac{4}{42} \cdot \left(\tanh\left(\frac{L_{n,4}}{2}\right) + \tanh\left(\frac{L_{n,5}}{2}\right)\right) +$$
$$\frac{8}{42} \cdot \left(\tanh\left(\frac{L_{n,2}}{2}\right) \cdot \tanh\left(\frac{L_{n,4}}{2}\right) + \tanh\left(\frac{L_{n,3}}{2}\right) \cdot \tanh\left(\frac{L_{n,5}}{2}\right)\right) -$$
$$\Re\{\bar{s}_n\}^2 - \Im\{\bar{s}_n\}^2.$$

As another example, consider the mixed set-partitioning 16-QAM constellation in A. Chindapol and J. A. Ritcey, "Design, analysis, and performance evaluation for BICM-ID with square QAM constellations in Rayleigh fading channels," IEEE J. Select. Areas Commun., vol. 19, no. 5, pp. 944-957, May 2001. This constellation is shown in Table 1, denoted as FIG. 4. By inspecting the mapping rule, one can find that $$\Re\{x_i\} = \frac{1}{\sqrt{10}} \cdot (-b'_{i,2} + 2 \cdot b'_{i,0} \cdot b'_{i,1} \cdot b'_{i,2} \cdot b'_{i,3}) \tag{32a}$$

$$\Im\{x_i\} = \frac{1}{\sqrt{10}} \cdot b'_{i,2} \cdot b'_{i,3} \cdot (1 - 2 \cdot b'_{i,0}) \tag{32b}$$

Therefore, $$\Re\{x_i\}^2 = \frac{1}{10} \cdot (5 - 4 \cdot b'_{i,0} \cdot b'_{i,1} \cdot b'_{i,3}) \tag{33a}$$

$$\Im\{x_i\}^2 = \frac{1}{10} \cdot (5 - 4 \cdot b'_{i,0}) \tag{33b}$$

And so one obtains the soft symbol and its variance as $$\bar{s}_n = \frac{1}{\sqrt{10}} \tanh\left(\frac{L_{n,2}}{2}\right)\left[-1 + 2\tanh\left(\frac{L_{n,0}}{2}\right)\tanh\left(\frac{L_{n,1}}{2}\right)\tanh\left(\frac{L_{n,3}}{2}\right) + \right. \tag{34a}$$
$$\left. \iota \cdot \tanh\left(\frac{L_{n,3}}{2}\right)\left(1 - 2\tanh\left(\frac{L_{n,0}}{2}\right)\right)\right]$$

$$\sigma_n^2 = \tag{34b}$$
$$1 - \frac{4}{10} \cdot \tanh\left(\frac{L_{n,0}}{2}\right) \cdot \left(1 + \tanh\left(\frac{L_{n,1}}{2}\right) \cdot \tanh\left(\frac{L_{n,3}}{2}\right)\right) - \Re\{\bar{s}_n\}^2 - \Im\{\bar{s}_n\}^2$$

This procedure, as implemented in the communication receiver contemplated herein, can be carried out with any constellation, not just the example ones presented here.

An example of the contemplated communication receiver is shown in FIG. 5 as a wireless communication apparatus 10 ("apparatus 10"). In one example, the apparatus 10 comprises, for instance, a base station or other radio network node in a wireless communication network. In another example, the apparatus 10 comprises a User Equipment ("UE") configured to operate in conjunction with one or more such wireless communication networks, e.g., HSPA and/or LTE networks. Of course, these examples are non-limiting, and the apparatus 10 should be understood as representing a broad range of communication devices or equipment.

It should also be understood that the illustrated architecture and corresponding circuitry is non-limiting. Other architectures and circuit arrangements could be configured to implement the advantageous expected symbol value and variance estimation processing disclosed herein.

Now, according to the example illustration, the apparatus 10 receives an incoming communication signal 12 that conveys one or more symbols 14 and/or 52. For purposes of this example, it may be assumed that the symbols 14 belong to a modulation constellation having a non-constant magnitude—i.e., one or more symbols in the constellation are defined as having a different nominal magnitude than one or more other symbols in the constellation. Additionally, or alternatively, the same applies to symbols 52. The symbols 14 may comprise one data stream and the symbols 52, if present, may comprise another data stream.

The apparatus 10 obtains transmitted data 16 by recovering the information bits represented by the incoming symbols 14 or 52. As will be explained in more detail herein, the symbols 14 (or 52) may cause self-interference because of multi-path reception and/or any given symbol 14 (or 52) may be interfered with by concurrent reception of a symbols 52 (or 14). The communication receiver 20 is configured to recover the data 16 from the received communication signal 12 and to perform Turbo equalization and/or interference cancellation processing to improve such reception, according to the advantageous soft modulation processing taught herein.

The example communication receiver 20 includes receiver front-end circuitry 22, a demodulator circuit 24, a soft modulation processing circuit 26, and a decoding circuit 28. The apparatus 10 further includes a communication transmitter 30 that includes transmitter signal processing circuitry 32—e.g., baseband processing that generates symbol data to be transmitted, corresponding to transmit information incoming to the communication transmitter 30 from elsewhere in the apparatus 10. The communication transmitter 30 further includes transmitter front-end circuitry 34, e.g., power amplifiers, antenna-coupling circuits, etc.

The illustrated communication processing and control circuits 36 generally include at least a portion of the communication receiver 20 and the communication transmitter 30. For example, the communication processing and control circuits 36 comprise one or more "baseband processors" that are configured to manage radio operations, including processing incoming and outgoing control signaling and user traffic, where the one or more baseband processors implement at least a portion of the communication receiver 20 and the communication transmitter 30.

In particular, in at least one embodiment, at least a portion of the communication receiver 20 is implemented in a microcontroller, microprocessor, Digital Signal Processor (DSP), or in multiple such units, or more generally using some type of digital processing circuit. Such circuitry may be fixed processing circuitry, programmable processing circuitry, or some combination thereof. In at least one example embodiment, a portion of the communication receiver 20—e.g., any one or more of the demodulator circuit 24, the soft modulation processing circuit 26, and the decoder 28 are implemented using programmable digital processing circuitry that is configured according to the teachings herein based on the execution of computer programs stored in a memory circuit or other computer-readable medium that is included in or otherwise accessible to the communication receiver 20.

To reflect such flexibility in implementation, and to indicate that receiver and transmitter processing bridges the digital and analog processing domains, the illustrated communication receiver 20 and communication transmitter 30 bridge the communication processing and control circuits 36 and transceiver circuitry 38 coupled to one or more RX/TX antennas 40. As a further point of flexibility, although not germane to understanding the present invention, the example apparatus 10 may include additional processing, control, and interface circuits 42. The presence, extent, and nature of these additional circuits will depend upon the nature and intended use of the apparatus 10.

The front-end circuitry 22 of the receiver 20 outputs a communication signal 50 corresponding to the antenna-received communication signal 12, e.g., after filtering, amplification, down-conversion and digitization by the receiver front-end circuitry 22. Thus, the communication signal 50 can be understood as a digitized version of the antenna-received signal 12 that is suitable for baseband processing.

The communication signal 50 conveys symbols 14 and/or 52 as received at the apparatus 10. These received symbols are corrupted versions of the corresponding constituent symbols in the defined (modulation) constellations used in their transmission. It may be assumed that the defined constellation(s) used to produce the symbols 14 and/or 52 are complex, meaning that each constituent symbols real and imaginary parts defined by a unique combination of bits. Those of ordinary skill in the art will recognize that each such bit occupies a bit position that is sign-controlling or magnitude-controlling according to a bit-to-symbol mapping of the defined constellation.

In at least one embodiment, the communication receiver 20 is configured to improve its reception and decoding of received symbols 14 and/or 52 based on performing Turbo equalization or soft interference cancellation with respect to the received communication signal 50 using a regenerated signal component corresponding to the symbol 14 of interest. Such operations are better seen in FIG. 6.

Figure 6:
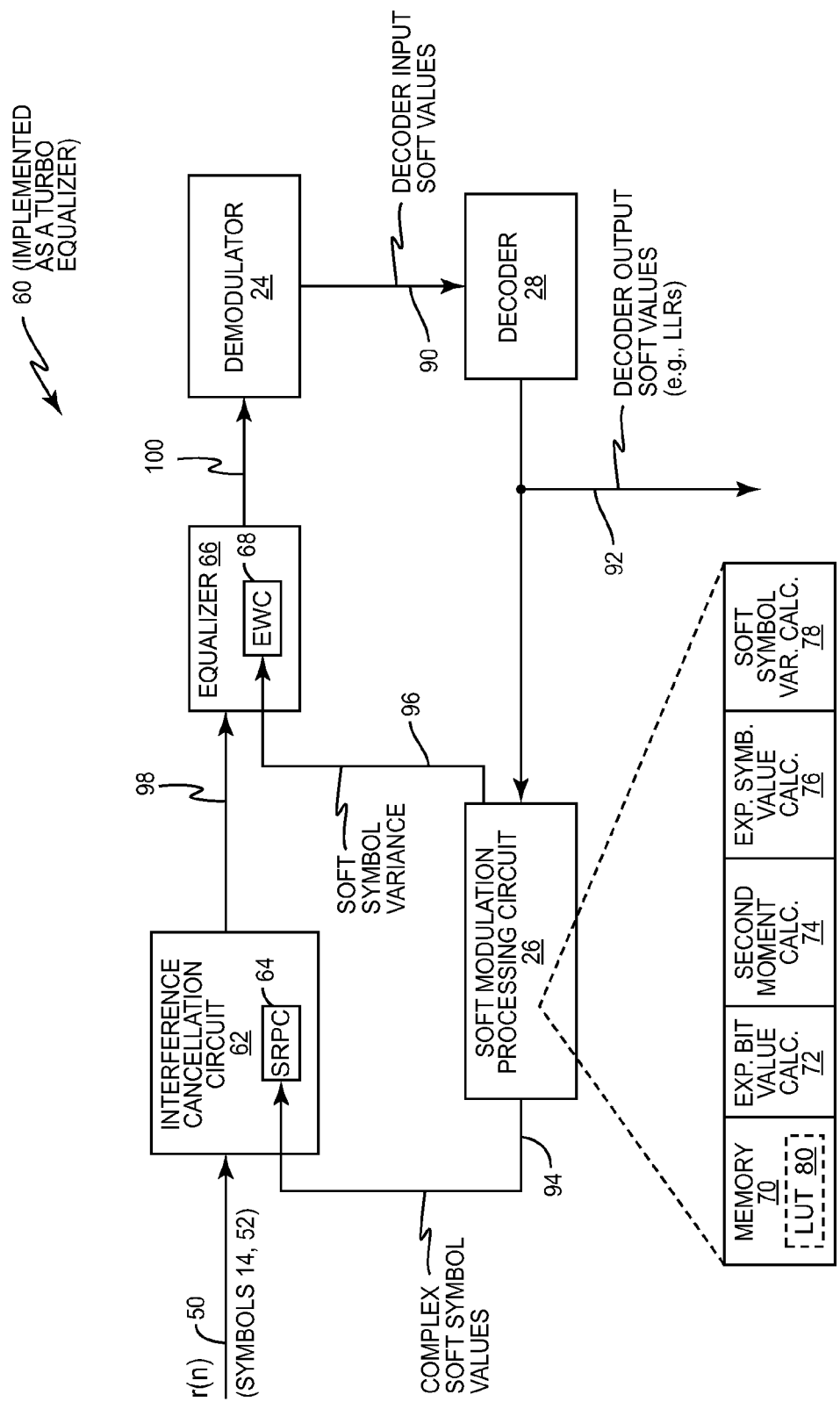
FIG. 6 is a block diagram of further details for one embodiment of the communication receiver included in the wireless communication apparatus of FIG. 5.

FIG. 6 depicts a Turbo equalizer circuit arrangement 60, which is implemented in the receiver 20, and which includes the demodulator 24, the soft modulation processing circuit 26, and the decoder 28. Further, the Turbo equalizer circuit arrangement 60 includes an interference cancellation circuit 62, with an included signal regeneration processing circuit 64 (denoted as "SRPC 64"), and an equalizer circuit 66, with an included equalization weight calculation circuit 68 (denoted as "EWC 68").

According to the further example details, the soft modulation processing circuit 26 includes a memory 70, an expected bit value calculation circuit 72, a second moment calculation circuit 74, an expected symbol value calculation circuit 76, and a soft symbol variance calculation circuit 78. These circuits may be implemented in fixed hardware, or programmable hardware, or some combination thereof. In at least one example, one or more of the these circuits are functionally implemented in one or more digital processors used to implement the soft modulation processing circuit 26, based on the execution of computer program instructions stored in the memory 70, or in another computer-readable medium accessible to the soft modulation processing circuit 26.

Thus, it will be understood that the illustrated architecture and division of functional processing circuits serves as a non-limiting example. More generally, the Turbo equalization processing at issue here and the soft modulation processing supporting Turbo equalization operations are implemented in one or more embodiments using at least one processing circuit implemented using, e.g., one or more microprocessors, microcontrollers, DSPs, or other programmable digital processing circuit.

In operation, the interference cancellation circuit 64 receives the communication signal 50, including one or more symbols 14 and/or 52. In one example, the Turbo equalizer circuit arrangement 60 is configured to suppress self-interference with respect to a stream of symbols 14 (or 52), where that self-interference arises from multi-path reception of the communication signal 50. In the same or other embodiments, the Turbo equalizer circuit arrangement 60 is configured to suppress interference caused by a stream of symbols 52 (or 14) with respect to another stream of symbols 14 (or 52) concurrently received in the communication signal 50.

It will be appreciated, then, that the term "interfering symbol" may denote self-interference with respect to a desired symbol received via multi-path and/or may denote a symbol that is received concurrently with a desired symbol. Further, it will be appreciated that the communication signal 50 may be a composite of channelized signals, with one or more such signals being "desired" with respect to decoding at the apparatus 10 and one or more such signals being "interfering" with respect to that decoding.

The soft modulation processing circuit 26 plays a central role in the cancellation/equalization operations. In one or more embodiments, the soft modulation processing circuit 26 comprises one or more digital processing circuits, e.g., one or more microprocessors and/or digital signal processors (DSPs) that are configured to perform soft modulation processing as taught herein, based on the execution of stored computer program instructions, e.g., stored in a memory 70 included in or accessible to the soft modulation processing circuit 26. The digital processing circuitry of the soft modulation processing circuit 26 also may comprise a portion of the digital processing resources within a processor that is configured to perform other received signal processing.

The soft modulation processing circuit 26 at least functionally includes the aforementioned calculation circuits, including the expected bit value calculation circuit 72, the second moment calculation circuit 74, the expected symbol value calculation circuit 76, and the soft symbol variance calculation circuit 78. These circuits in one or more embodiments are computational units that are implemented in digital processing circuitry via the execution of corresponding program instructions and in one or more embodiments they make use of a Look-Up-Table (LUT) 80 held in memory 70, where the LUT 80 holds hyperbolic tangent function values corresponding to different LLR values and is thus indexed using a given LLR. Of course, at least some of the illustrated computation circuits also may be implemented as fixed or otherwise dedicated processing hardware.

Regardless of the specific circuit and processing unit arrangement adopted for the soft modulation processing circuit 26, the one or more processing circuits comprising the soft modulation processing circuit 26 are configured to receive Log Likelihood Ratios (LLRs) from the decoder 28. These LLRs comprise or are included in the decoder output soft values 92 shown in the illustration, which are decoded from the decoder input soft values 90 provided by the demodulator 24.

The LLRs received by the soft modulation processing circuit 26 correspond to bits in one or more interfering symbols 14 or 52 in the received communication signal 50. The soft modulation processing circuit 26, e.g., via its expected bit value calculation circuit 72, is configured to calculate expected bit values for the bits in each interfering symbol 14 or 52 as a function of the corresponding LLRs.

For example, in one or more embodiments, the soft modulation processing circuit 26 calculates the expected bit values for the LLRs provided to it by the decoding circuit 28 according to a hyperbolic tangent function that maps LLRs to expected bit values. In at least one such embodiment, let an interfering symbol 14 or 52 be the n-th one among a plurality of interfering symbols 14 or 52 in the received communication signal 50. Here, the LLR of the i-th bit in the n-th interfering symbol 14 or 52 is denoted as $L_{n,i}$ and the hyperbolic tangent function is expressed as $$\tanh\left(\frac{L_{n,i}}{2}\right).$$

Further, at least one such embodiment makes advantageous use of the earlier mentioned LUT 80 to reduce the computations needed to determine the hyperbolic tangent function values for the LLRs of each interfering symbol 14 or 52. Here, the soft modulation processing circuit 26 determines the expected bit values for a given LLR of a given one of the interfering symbol bits by indexing into the LUT 80. The LUT 80 stores a plurality of pre-computed results of the hyperbolic tangent function for a range of LLRs.

Further, using the advantageous computations taught herein, the soft modulation processing circuit 26 is configured to calculate a second moment of the expected symbol value of each interfering symbol 14 or 52—i.e., the soft modulation processing circuit 26 efficiently computes $E[|s_n|^2]$. To do so, the second moment calculation circuit 74 is configured to use one or more terms comprising the expected bit values of only those bits in the interfering symbol 14 or 52 that are magnitude-controlling bits in accordance with a defined bit-to-symbol mapping of a defined constellation used to modulate the interfering symbol 14 or 52 for transmission. See, for example, the discussion immediately below Equation 23b, presented earlier herein.

Referring to earlier explanations herein, a given constellation defines a number of unique constituent symbols according to specific bit-to-symbol mappings. For constellations that use non-constant magnitudes, e.g., higher-order QAM, only some bit positions within the constituent symbols are magnitude controlling. The second moment calculation contemplated herein exploits that fact to simplify the second moment computations and thereby simplifies computation of expected symbol values and their corresponding soft symbol variances.

In one or more embodiments, the expected symbol value calculation circuit 76 calculates the expected symbol value of each interfering symbol 14 or 52 as a linear function of terms comprising the expected bit values for all of the bits in the interfering symbol 14 or 52. Further, the soft symbol variance calculation circuit 78 calculates the variance of the expected symbol value for each interfering symbol 14 or 52, referred to as the "soft symbol variance," based on the second moment of the expected symbol value as calculated for the interfering symbol 14 or 52 and the corresponding expected symbol value squared. The discussion immediately below Equation 23b provides examples of these computations.

The expected symbol values thus computed are output as complex soft symbol values 94, along with their corresponding soft symbol variances 96. The signal regeneration processing circuit 64 in the interference cancellation circuit 62 uses the complex soft symbol values 94 to create corresponding regenerated signal components that are subtracted from (or otherwise combined with) the received communication signal 50, to produce a reduced- or suppressed-interference version of the received communication signal 50, as signal 98. The regenerated signal components will be understood as re-channelized versions of the complex soft symbol values 94 provided by the soft modulation processing circuit 26.

The equalizer circuit 66 receives the suppressed-interference signal 98 and equalizes it to produce an equalized output signal 100 that is provided to the demodulator 24 for generation of the decoder input soft values 90. The equalization weight calculation circuit 68 produces the equalization weights used in equalizing the signal 98 based on the soft symbol variances 96.

Thus, it will be understood that the Turbo equalization circuit arrangement 60 is configured to regenerate the signal components of the received communication signal 50 corresponding to the one or more interfering symbols 14 or 52, as a function of the expected symbol values generated by the soft modulation processing circuit 26. The Turbo equalization circuit arrangement 60 also uses the corresponding soft symbol variances to compute equalization weights for equalizing the received communication signal 50.

In another aspect of computational simplification, note that the bits of each interfering symbol 14 or 52 comprise respective subsets corresponding to the real and imaginary parts of the interfering symbol 14 or 52. In one or more embodiments, the soft modulation processing circuit 26 determines the expected symbol value squared by defining an expression that is a function of the magnitude squared value of either the real or imaginary part.

Advantageously, this expression is formulated such that it takes on the numerical values of +1 or −1 in direct dependence on the binary value of any one of the magnitude-controlling bits in the respective subset. Correspondingly, the soft modulation processing circuit 26 determines the value of the expression where the expected bit value of each of the magnitude-controlling bits in the respective subset is substituted in place of the magnitude squared value of the real or imaginary part.

Figure 7:
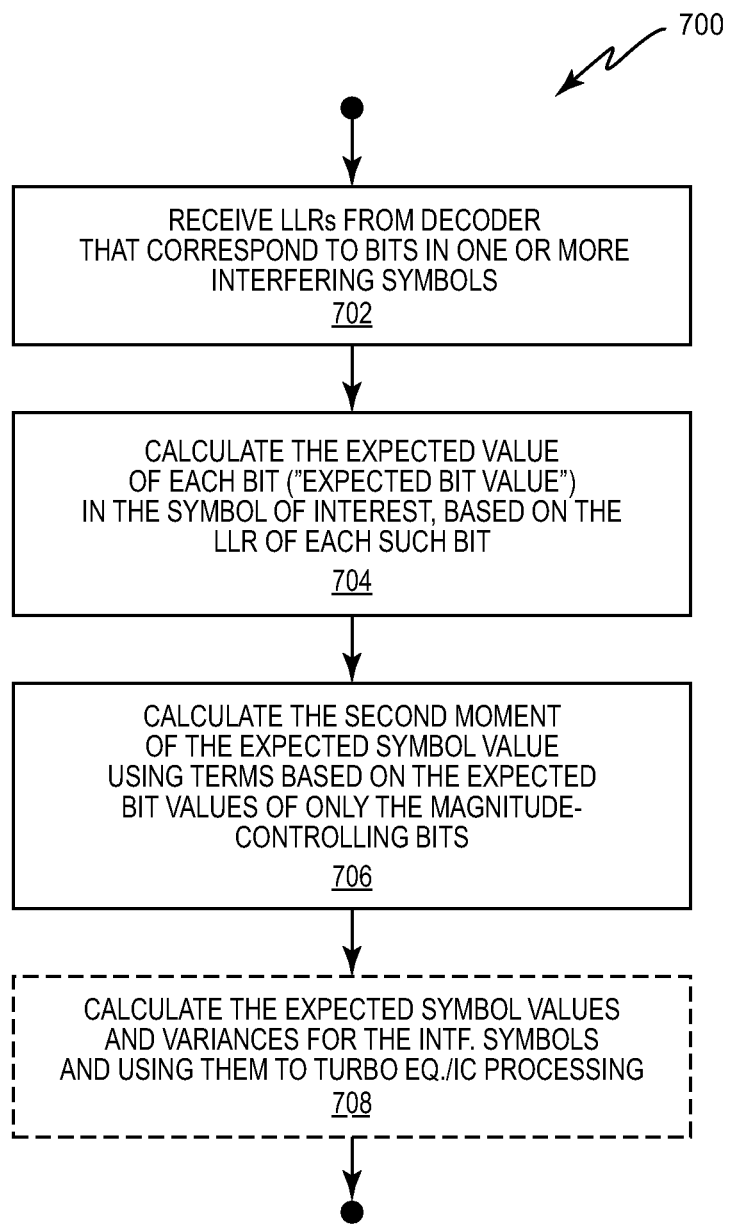
FIG. 7 is a logic flow diagram of one embodiment of a method of soft modulation processing, such as may be implemented in the communication receiver of FIGS. 5 and 6.

FIG. 7 illustrates an example method 700 of the above-described soft modulation processing, e.g., as implemented by the communication receiver 20. It will be understood that one or more of the illustrated processing steps may be performed in an order other than that illustrated, and that one or more steps may be performed on a repeated basis, as part of ongoing receiver processing, for example. Further, the illustrated method 700 may be integrated into or be part of a larger, overall received signal processing method.

With the above qualifications in mind, the method 700 includes receiving LLRs from a decoder in the communication receiver 20 that correspond to bits in one or more interfering symbols 14 or 52 in the communication signal 50 (Block 702). The method 700 further includes calculating expected bit values for the bits in each interfering symbol 14 or 52 as a function of the corresponding LLRs (Block 704). Here, the "corresponding LLRs" for each interfering symbol 14 or 52 will be understood as the LLRs corresponding to the bits comprising that interfering symbol.

The method 700 continues with calculating the second moment of the expected symbol value for each interfering symbol 14 or 52, using one or more terms comprising the expected bit values of only those bits in the interfering symbol 14 or 52 that are magnitude-controlling bits in accordance with a defined bit-to-symbol mapping of a defined constellation used to modulate the interfering symbol 14 or 52 for transmission (Block 706). This approach can be understood as exploiting the recognition herein that the computation of the second moment can be made to depend on the magnitude-controlling bits, which simplifies the second moment computation.

In turn, the soft symbol variance can be calculated efficiently from the second moment. Thus, in at least one embodiment, the method 700 further includes calculating a variance of the expected symbol value for each interfering symbol 14 or 52, referred to as a soft symbol variance, based on the second moment of the expected symbol value calculated for the interfering symbol 14 or 52 and the corresponding expected symbol value squared. As was shown in multiple earlier examples, the expected symbol value of each interfering symbol 14 or 52 may be computed as a linear function of terms comprising the expected bit values for all of the bits in the interfering symbol 14 or 52.

In at least one embodiment of the method 700, the expected symbol values and soft symbol variances for the interfering symbol(s) 14 or 52 are used in Turbo equalization and/or soft interference cancellation (IC) processing (Block 708). An arrangement 60 providing for such processing was shown by way of example in FIG. 6.

In at least one such embodiment, the Turbo equalization/IC processing includes regenerating a signal component of the received communication signal 50 corresponding to the one or more interfering symbols 14 or 52, as a function of the expected symbol values and the soft symbol variances calculated for the one or more interfering symbols 14 or 52, and using the regenerated signal component in the Turbo equalization or soft IC processing.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of soft symbol processing in a communication receiver comprising:
   receiving Log Likelihood Ratios (LLRs) from a decoder in said communication receiver that correspond to bits in one or more interfering symbols in a communication signal received by the communication receiver;
   calculating expected bit values for the bits in each interfering symbol as a function of the corresponding LLRs; and
   calculating a second moment of the expected symbol value for each interfering symbol using one or more terms comprising the expected bit values of only those bits in the interfering symbol that are magnitude-controlling bits in accordance with a defined bit-to-symbol mapping of a defined constellation used to modulate the interfering symbol for transmission.

2. The method of claim 1, wherein calculating the second moment of the expected symbol value comprises calculating the second moment of each interfering symbol as a linear function of terms based on the expected bit values of only those bits in the symbol that are magnitude-controlling bits according to the defined constellation.

3. The method of claim 2, wherein the one or more terms of the linear function that are based on the expected bit values of the magnitude-controlling bits are each a function of the expected bit value of a single magnitude-controlling bit or a product of the expected bit values of a plurality of magnitude-controlling bits.

4. The method of claim 1, further comprising calculating the expected symbol value of each interfering symbol as a linear function of terms comprising the expected bit values for all of the bits in the interfering symbol.

5. The method of claim 1, further comprising calculating a variance of the expected symbol value for each interfering symbol, referred to as a soft symbol variance, based on the second moment of the expected symbol value as calculated for the interfering symbol and the corresponding expected symbol value squared.

6. The method of claim 1, wherein said soft symbol processing is performed as part of Turbo equalization processing for the received communication signal, and wherein the method further comprises:
   regenerating a signal component of the received communication signal as a function of the expected symbol values corresponding to the one or more interfering symbols, and using the regenerated signal component to suppress interference in the received communication signal corresponding to the one or more interfering symbols; and
   computing equalization weights as a function of the soft symbol variances and equalizing the received communication signal according to said equalization weights.

7. The method of claim 1, further comprising calculating the expected bit values according to a hyperbolic tangent function that maps LLRs to expected bit values.

8. The method of claim 7, wherein the one or more interfering symbols is an n-th one among a plurality of interfering symbols in the received communication signal (50), and wherein the LLR of the i-th bit in the n-th symbol of interest is denoted as $L_{n,i}$ and wherein the hyperbolic tangent function is expressed as $$\tanh\left(\frac{L_{n,i}}{2}\right).$$

9. The method of claim 7, wherein determining the expected bit values according to the hyperbolic tangent function that maps LLRs to expected bit values comprises, for a given LLR of a given one of the bits in one of the one or more interfering symbols, indexing into a stored Look-Up Table (LUT) comprising a plurality of pre-computed results of the hyperbolic tangent function for a range of LLRs.

10. A communication receiver that is configured to perform soft symbol processing with respect to a communication signal received by the communication receiver and comprises one or more processing circuits configured to:
    receive Log Likelihood Ratios (LLRs) from a decoder in said communication receiver that correspond to bits in one or more interfering symbols in the communication signal;
    calculate expected bit values for the bits in each interfering symbol as a function of the corresponding LLRs; and
    calculate a second moment of the expected symbol value for each interfering symbol using one or more terms comprising the expected bit values of only those bits in the interfering symbol that are magnitude-controlling bits in accordance with a defined bit-to-symbol mapping of a defined constellation used to modulate the interfering symbol for transmission.

11. The communication receiver of claim 10, wherein the one or more processing circuits are configured to calculate the second moment of the expected symbol value based on being configured to calculate the second moment of each interfering symbol as a linear function of terms based on the expected bit values of only those bits in the symbol that are magnitude-controlling bits according to the defined constellation.

12. The communication receiver of claim 11, wherein the one or more terms of the linear function that are based on the expected bit values of the magnitude-controlling bits are each a function of the expected bit value of a single magnitude-controlling bit or a product of the expected bit values of a plurality of magnitude-controlling bits.

13. The communication receiver of claim 10, wherein the one or more processing circuits are configured to calculate the expected symbol value of each interfering symbol as a linear function of terms comprising the expected bit values for all of the bits in the interfering symbol.

14. The communication receiver of claim 10, wherein the one or more processing circuits are configured to calculate a variance of the expected symbol value for each interfering symbol, referred to as a soft symbol variance, based on the second moment of the expected symbol value as calculated for the interfering symbol and the corresponding expected symbol value squared.

15. The communication receiver of claim 10, wherein said communication receiver is configured to perform Turbo equalization processing for the received communication signal, and further comprises:

an interference cancellation circuit configured to regenerate a signal component of the received communication signal as a function of the expected symbol values corresponding to the one or more interfering symbols, and use the regenerated signal component to suppress interference in the received communication signal corresponding to the one or more interfering symbols; and an equalization circuit configured to compute equalization weights as a function of the soft symbol variances and equalize the received communication signal according to the equalization weights.

16. The communication receiver of claim 10, wherein the one or more processing circuits are configured to calculate the expected bit values according to a hyperbolic tangent function that maps LLRs to expected bit values.

17. The communication receiver of claim 16, wherein the one or more interfering symbols is an n-th one among a plurality of interfering symbols in the received communication signal, and wherein the LLR of the i-th bit in the n-th symbol of interest is denoted as $L_{n,i}$ and wherein the hyperbolic tangent function is expressed as $$\tanh\left(\frac{L_{n,i}}{2}\right).$$

18. The communication receiver of claim 16, wherein the one or more processing circuits are configured to determine the expected bit values according to the hyperbolic tangent function that maps LLRs to expected bit values comprises, for a given LLR of a given one of the bits in one of the one or more interfering symbols by indexing into a stored Look-Up Table (LUT) comprising a plurality of pre-computed results of the hyperbolic tangent function for a range of LLRs.

* * * * *

UNITED STATES PATENT AND TRADEMARK OFFICE
CERTIFICATE OF CORRECTION

PATENT NO. : 8,934,581 B2
APPLICATION NO. : 13/454919
DATED : January 13, 2015
INVENTOR(S) : Samuel Bebawy et al.

Page 1 of 1

It is certified that error appears in the above-identified patent and that said Letters Patent is hereby corrected as shown below:

In the Specification

In Column 1, Lines 55-57, delete " $\prod_{k=0}^{Q-1}$ " and insert -- $\prod_{k=0}^{Q-1} Pr$ --, therefor.

In Column 5, Line 61, delete " $\underline{s}_n = \Re\{\bar{s}_n\} + \Im\{\bar{s}_n\}.$ " and insert -- $\bar{s}_n = \Re\{\bar{s}_n\} + \iota\Im\{\bar{s}_n\}.$ --, therefor.

In Column 13, Line 48, delete "circuit 64" and insert -- circuit 62 --, therefor.

Signed and Sealed this
Thirtieth Day of June, 2015

Michelle K. Lee
*Director of the United States Patent and Trademark Office*